Nov. 1, 1932.  E. F. LOWEKE  1,885,121
VALVE MECHANISM
Filed Feb. 2, 1929  2 Sheets-Sheet 1
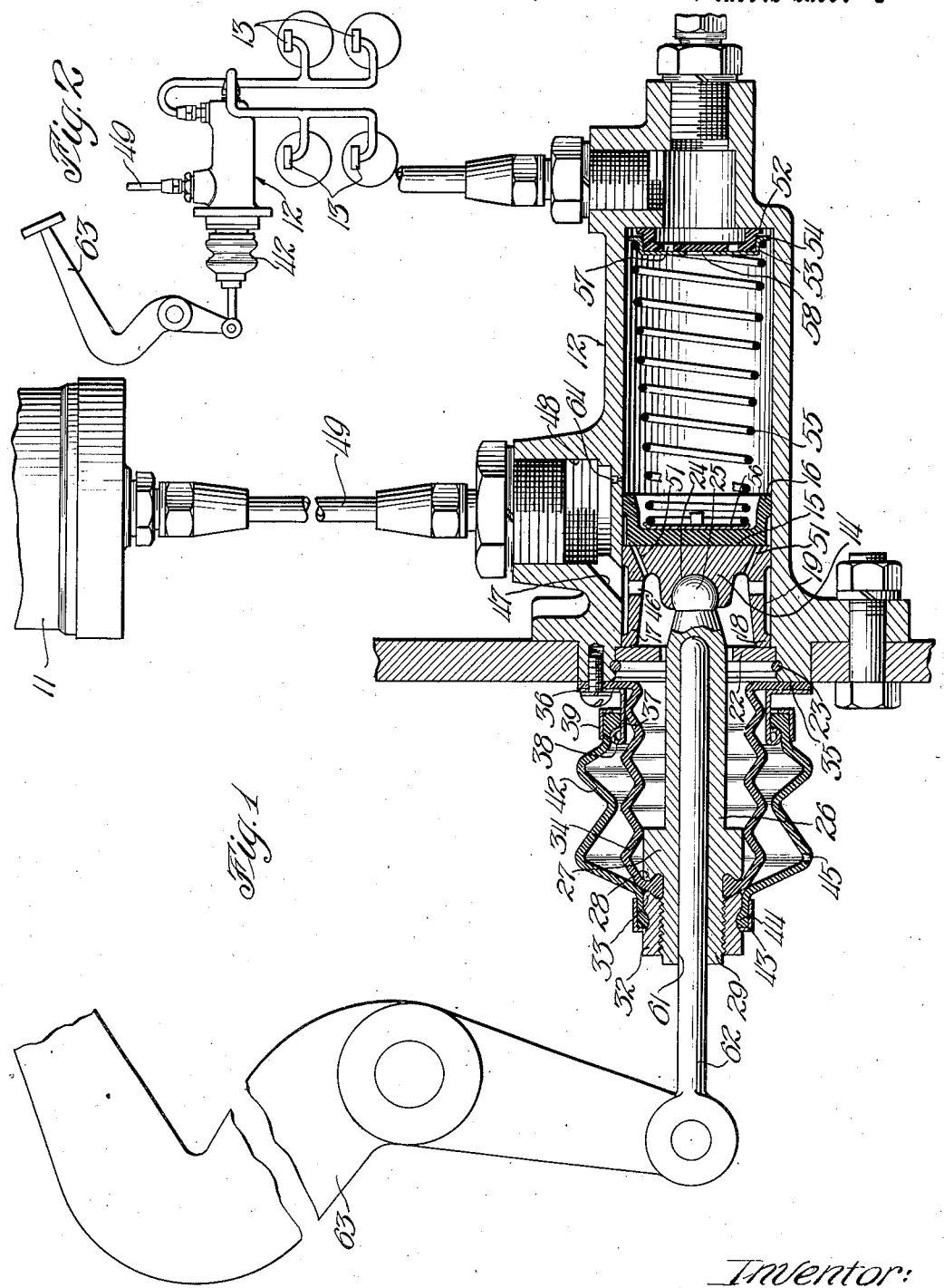
Inventor:
Erwin F. Loweke
By Williams, Bradbury, McCaleb & Hinkle
Attys.

Nov. 1, 1932. E. F. LOWEKE 1,885,121
VALVE MECHANISM
Filed Feb. 2, 1929   2 Sheets-Sheet 2
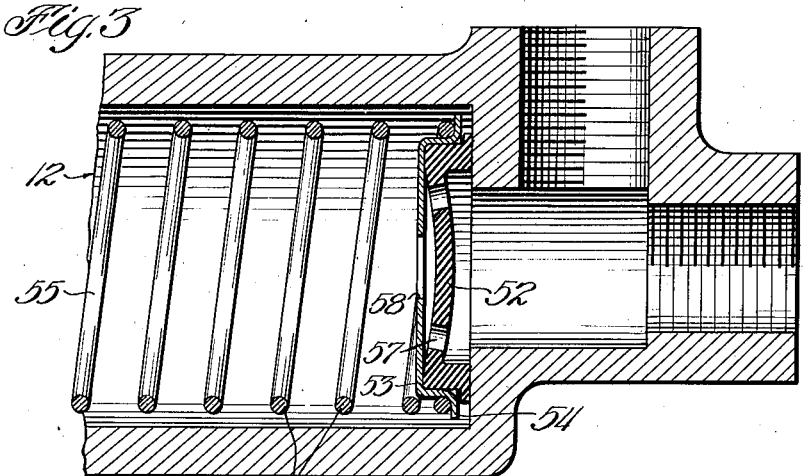
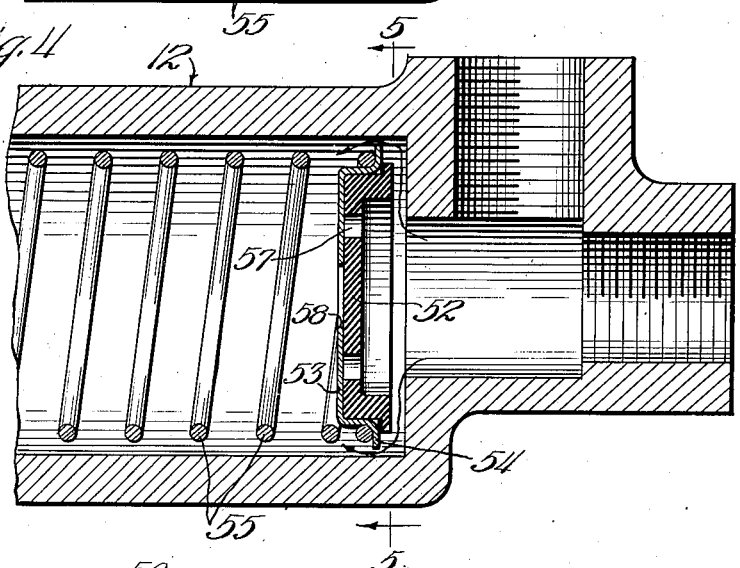
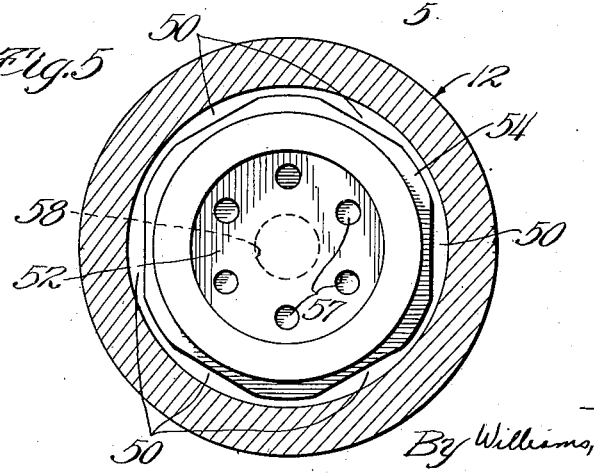
Inventor:
Erwin F. Loweke
By Williams, Bradbury, McCaleb & Hinkle
Attys.

Patented Nov. 1, 1932

1,885,121

UNITED STATES PATENT OFFICE

ERWIN F. LOWEKE, OF DETROIT, MICHIGAN, ASSIGNOR TO HYDRAULIC BRAKE COMPANY, OF DETROIT, MICHIGAN, A CORPORATION OF CALIFORNIA

VALVE MECHANISM

Application filed February 2, 1929. Serial No. 337,122.

My invention pertains to valves and is particularly desirable for use in hydraulic brake systems, although it is equally applicable to other types of mechanism.

In order to prevent air from entering the system at the wheel brake cylinders it is desirable to maintain a higher than atmospheric pressure in the wheel brake cylinders and the fluid lines leading thereto. For this purpose a double acting valve is provided at the discharge end of the cylinder allowing the fluid to leave the cylinder freely but restraining its return to the cylinder to maintain a predetermined pressure in the wheel brake cylinders and fluid lines.

An object of the invention is to provide an improved valve mechanism.

A further object is to provide a valve mechanism which is simple in construction and effective in operation.

A further object is to provide a double acting valve mechanism consisting of relatively few parts.

A further object is to provide a valve mechanism in which the parts are readily replaceable.

Other objects and advantages will appear as the description proceeds.

Referring to the drawings:

Fig. 1 is a longitudinal section of the master cylinder assembly;

Fig. 2 is a schematic view of the master cylinder and the wheel brake cylinders, illustrating the manner of connecting the wheel brake cylinders to the master cylinder;

Fig. 3 is a fragmentary section showing the valve during the protractile movement of the piston;

Fig. 4 is a fragmentary section showing the valve during the retractile movement of the piston; and Fig. 5 is a section taken on the line 5—5 of Fig. 4.

The invention comprises, in general, a fluid reservoir 11, master cylinder 12 and wheel brake cylinders 13. The master cylinder has a piston 14 reciprocably mounted therein. The piston comprises a face portion 15 adapted to carry a packing cup 16 and a rearwardly extending flange 17 spaced from the cylinder wall. The end of the rearwardly extending flange 17 has a radial flange 18 which contacts with the cylinder wall to guide the piston in the cylinder, forming an annular recess 19 around the piston.

A ring 22 is retained in the end of the cylinder by a split ring 23 and is adapted to limit the rearward movement of the piston. The piston is provided with a socket 24 which engages a ball 25 of a plunger 26 by means of which the piston may be moved. Plunger 26 is provided at its opposite end with an annular ring 27 having an under cut shoulder 28. The end 29 of the plunger is threaded and is adapted to receive a nut 32 having a similar under cut shoulder 33.

Shoulders 28 and 33 are adapted to engage the annular beaded end of a boot 34 of rubber or any other suitable material which surrounds the plunger. The front end of the boot is formed into a radial extending flange 35 which is held against the cylinder by a ring 36. Ring 36 has a cylindrical portion 37 integral therewith and extending rearwardly, which is provided at its end with an annular bead 38.

A collar 39 serves to retain the enlarged annular end of a second boot 42 retaining this end in firm engagement with the annular bead 38. The opposite end of boot 42 is secured to the nut 32 by a collar 43, the nut being provided with a suitable groove for receiving the enlarged annular end portion 44 of boot 42. Boot 42 may be made of any suitable flexible material which is not attacked by the mineral oils used for lubricating vehicles. A suitable material for this purpose is impregnated airplane cloth or leather. Boot 42 thus serves to protect the flexible boot 34 from oils and dust and other matter which might be injurious thereto. Boot 42 is provided at its lower side with an aperture 45 connecting the interior of the boot with the atmosphere.

The rearwardly extending flange 17 of the piston is provided with an aperture 46, and the wall of cylinder 12 is provided with an aperture 47 leading into the space 48 which is in communication through a tube 49 with the fluid reservoir. Thus fluid from the reservoir passes through tube 49, space 48, the aperture 47 into the annular recess 19 of the piston and through passages 46 in the piston into the flexible boot 34, which forms a fluid chamber enclosing the rear side of the piston.

The face of the piston is provided with a plurality of passages 51 which extend into the space in the cylinder. During the forward movement of the piston these passages are covered by the packing cup 16 causing a fluid pressure to be produced in the master cylinder.

At the discharge end of the cylinder is a valve comprising a resilient cup-shaped valve member 52 adapted to rest against the valve seat formed by the end of the cylinder wall. Surrounding the resilient member 52 is a cup-shaped rigid valve member 53 having a radially extending annular flange 54. The outer edge of flange 54 is generally circular having a plurality of portions cut out along chords of the circle to provide spaces 50 for the free passage of fluid past the flange. A spring 55 is interposed between the piston and the valve resting at one end against a washer 56 engaging the packing cup 16 and at the other end against the annular flange of the rigid valve member 53, urging this member forward and yieldingly retaining the resilient member 52 against its seat. The yielding valve member 52 is provided with a plurality of apertures 57 and the rigid valve member 53 is provided with a central aperture 58.

As the piston 14 moves forwardly producing a fluid pressure in the cylinder, fluid passes through aperture 58 forcing the central portion of the yielding valve member 52 away from the rigid valve member and allowing the fluid to pass through apertures 57 to the wheel brake cylinders, as shown in Fig. 3, to apply the brakes.

Plunger 26 is provided with a cylindrical bore 61 into which a connecting rod 62 pivotally attached to the end of pedal 63 projects. This construction causes the depression of the pedal to produce a positive movement of the piston in its forward direction. However, upon release of the pedal and its return to its normal position, the piston will not be positively withdrawn but instead connecting rod 62 will be withdrawn from plunger 26, the retraction of the piston being caused by spring 55. During the retraction of the piston the valve in the end of the cylinder will be yieldingly urged to its seat by the spring to maintain a positive pressure in the wheel brake cylinders and the fluid lines leading thereto. The fluid pressure from the wheel brake cylinders and fluid lines will move the central portion of the resilient valve member to the position shown in Fig. 4, closing aperture 58, and the valve upon a sufficient pressure will be unseated allowing fluid to return to the cylinder.

The amount of positive pressure in the wheel brake cylinders will depend upon the relative sizes of the valve and the piston. Since the rear side of the piston is subjected to atmospheric pressure, the valve may be made of such a size as to maintain a pressure of six pounds above atmospheric pressure in the wheel brake cylinders.

Retraction of the piston produces a low pressure in the master cylinder, causing the packing cup to become unseated and allowing fluid from the rear side of the piston to pass through passages 51 into the master cylinder.

It will be noted that it is impossible for a low pressure to be produced in the chamber formed by flexible boot 34 since any depletion of the liquid therein will merely cause a contraction of the boot corresponding to the reduction in the volume of the boot without resulting in a low pressure therein. Furthermore, the fluid chamber formed by the boot is constantly in communication with the fluid reservoir to supply additional fluid thereto.

When the piston arrives in its retracted position there will be an excess of fluid in the master cylinder due to the fact that the fluid will continue to enter the cylinder from the wheel brake cylinders after the piston is retracted. The excess fluid which is present in the cylinder may escape through a passage 64 in the upper wall of the cylinder located immediately in front of the retracted position of the piston. Thus upon each application of the brakes an excess of fluid will be provided in the master cylinder, due to a low pressure therein. However, the valve at the exit of the cylinder and the boot at the rear side of the piston enclosing the other end of the cylinder effectively prevent the low pressure in the master cylinder from extending to any point at which there is a possibility of air being drawn into the brake system.

Having described the nature and embodiments of my invention, what I claim and desire to secure by United States Letters Patent is as follows:

1. A double acting valve mechanism comprising a valve seat, a cup-shaped member having an aperture therein, a peripheral flange thereon, a yielding member in the cup-shaped member having an aperture laterally spaced from the aperture in the cup-shaped member, said yielding member being movable from the cup-shaped member to provide a passage through the valve and into contact with the cup-shaped member to close the passage through the valve, and means for maintaining said resilient member in engagement with the valve seat.

2. A valve mechanism comprising a valve seat and a port associated therewith, a yielding member having an aperture, a rigid member provided with an aperture laterally spaced from the aperture in the yielding member, and means adapted to engage the yieldable member with the valve seat, said apertures constituting a passageway for fluid to said port, the yielding and rigid members being movable from the valve seat as a unit to permit the flow of liquid around the valve.

3. A double acting valve mechanism comprising a valve seat, a resilient member engageable with the valve seat, a rigid member engaging the periphery of the resilient member, the intermediate portion of the resilient member being movable toward and away from the rigid member, said members having offset apertures, and a spring for yieldably engaging the rigid member to urge the resilient member to the valve seat.

4. A valve mechanism comprising a valve seat, a cup-shaped resilient member having a radially extending flange, a similarly shaped rigid member surrounding the resilient member, the members having offset apertures which are closed when the inner portions of the members are in contact and open when the inner portions are in spaced relation, and a spring for normally urging the members toward the valve seat.

5. A valve mechanism comprising a valve seat and a port associated therewith, a resilient member engageable with said seat, and a rigid member contacting with the periphery of the resilient member to engage the periphery with said seat to close said port, said members being normally contiguous and having offset apertures, said members adapted to be separated to provide a passage through the apertures to said port and in contact to close said apertures to permit said resilient member to be movable from the valve seat to open said port.

6. A double acting valve unit comprising a valve seat and a port associated with the valve seat, a valve having a rigid member and a resilient member adjacent thereto, said members being provided with offset apertures, said members being separable by fluid pressure to provide a passage through the apertures therein to the port in one direction, and spring means for urging the valve against the valve seat to retard the passage of the fluid in the opposite direction.

In witness whereof, I hereunto subscribe my name this 30th day of January, 1929.

ERWIN F. LOWEKE.